(No Model.)
H. WOODWARD.
ELECTRODE FOR SECONDARY BATTERIES.
No. 571,143. Patented Nov. 10, 1896.
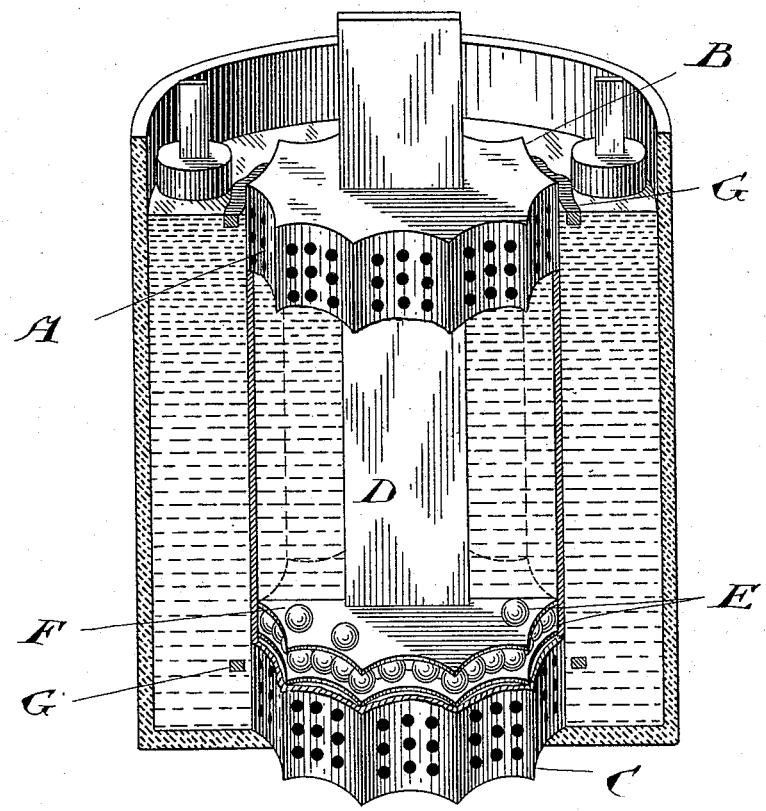
Witnesses
Fred Clarke
A N Neff
Inventor
Henry Woodward
by
Ridout & Maybee
Attys

UNITED STATES PATENT OFFICE.

HENRY WOODWARD, OF TORONTO, CANADA.

ELECTRODE FOR SECONDARY BATTERIES.

SPECIFICATION forming part of Letters Patent No. 571,143, dated November 10, 1896.

Application filed March 23, 1896. Serial No. 584,526. (No model.)

*To all whom it may concern:*

Be it known that I, HENRY WOODWARD, of the city of Toronto, in the county of York and Province of Ontario, Canada, have invented a certain new and Improved Electrode for Secondary Batteries, of which the following is a specification.

The object of my invention is to devise a tubular electrode which will expose as large a surface of active material to the electrolyte as possible; and it consists, essentially, in placing in a lead tube provided with a lead core pellets of red oxid of lead arranged in layers separated from one another by plates of lead, substantially as hereinafter more particularly described and then definitely claimed.

The drawing is a perspective view of an electrode constructed in accordance with my invention.

In the drawing, A is a perforated leaden tube, preferably corrugated, as shown, to increase its surface.

B and C are the top and bottom, respectively, of this tube. They may be made of lead or, if desired, of some inactive material, such as ebonite.

D is a ribbon of lead, forming a central core extending through the tube and projecting upwardly therefrom to form a point of connection when the battery is in use.

E is the filling of the electrode, composed of a number of pellets of red oxid of lead.

F are leaden plates slipped over the core D and fitting the inside of the tube A. These plates divide the filling E into a series of layers and thus prevent the interstices between one layer of pellets being filled up by the layer next above them. From this construction it follows that the electrolyte has free access to all the filling or active material contained in the tube, which, as is well understood, is a most important consideration in an electrode for secondary batteries.

G are rings of vulcanite placed around the top and bottom of the tube A to prevent the tubes comprising the other electrode from coming in contact therewith.

Although the best results will be obtained by making the tube A and plates F of lead, yet good results might be obtained if they were made of vulcanite, papier-mâché, or other inactive material.

I describe the filling as being of red oxid of lead, but other materials used in the electrodes of secondary batteries might be substituted for the red oxid as a filling.

The construction described is particularly adapted for use in a cell in which one central electrode is surrounded by a number of other tubes comprising the electrodes of opposite name. The tubes of the divided electrode may be constructed on a similar principle, but this construction is not so essential as it is in the larger central electrode. Two of the tubes comprising the other electrode are shown in the drawing.

In the drawing only a few of the plates and layers of pellets are shown.

What I claim as my invention is—

1. An electrode for secondary batteries comprising a perforated tube; a central ribbon of lead forming a core; a filling of pellets of red oxid of lead, and plates dividing the filling of pellets into a series of layers, substantially as and for the purpose specified.

2. An electrode for secondary batteries comprising a perforated leaden tube; a central ribbon of lead forming a core; a filling of pellets of red oxid of lead, and leaden plates dividing the filling of pellets into a series of layers, substantially as and for the purpose specified.

3. An electrode for secondary batteries comprising a perforated leaden tube with corrugated walls; a central ribbon of lead forming a core; a filling of pellets of red oxid of lead, and leaden plates shaped to fit the inside of the corrugated tube and dividing the filling of pellets into a series of layers, substantially as and for the purpose specified.

Toronto, February 25, 1896.

HENRY WOODWARD.

In presence of—
A. M. NEFF,
FREDK. CLARKE.